(12) United States Patent
Kröger (10) Patent No.: US 6,439,374 B2
(45) Date of Patent: Aug. 27, 2002

(54) OSCILLATING DRIVE FOR RESONANCE SYSTEMS

(75) Inventor: Dietrich Kröger, Wiesbaden (DE)

(73) Assignee: Netter GmbH (DE)

( * ) Notice: Subject to any disclaimer, the term of this patent is extended or adjusted under 35 U.S.C. 154(b) by 0 days.

(21) Appl. No.: 09/835,740

(22) Filed: Apr. 16, 2001

Related U.S. Application Data (63) Continuation of application No. 09/368,277, filed on Aug. 3, 1999, now Pat. No. 6,737,748, which is a continuation-in-part of application No. 08/813,366, filed on Mar. 7, 1997, now abandoned.

(30) Foreign Application Priority Data

Mar. 8, 1996 (DE) .......................... 196 09 039

(51) Int. Cl.$^7$ .......................... B65G 25/04; B65G 27/08
(52) U.S. Cl. .................... 198/763; 198/750.5; 198/768
(58) Field of Search ................................. 198/763, 764, 198/768, 750.5

(56) References Cited

U.S. PATENT DOCUMENTS

| 2,868,357 | A | 1/1959 | Thomas |
| 3,748,553 | A | 7/1973 | Reiner |
| 4,256,014 | A | 3/1981 | Kroger |
| 5,211,277 | A | 5/1993 | Mount |
| 5,404,996 | A | 4/1995 | Durnil |
| 5,606,231 | A | 2/1997 | Kroger et al. |
| 5,816,386 | A | 11/1998 | Carlyle |

FOREIGN PATENT DOCUMENTS

| CH | 443002 A | 1/1968 |
| DE | 470098 C | 1/1929 |
| DE | 1993476 U | 11/1966 |
| DE | 1107001 B | 5/1967 |
| DE | 2247149 A | 9/1972 |
| GB | 1065851 | 4/1967 |
| JP | 01284372 A | 11/1989 |

*Primary Examiner*—Christopher D. Ellis
*Assistant Examiner*—Gene O. Crawford
(74) *Attorney, Agent, or Firm*—Lee, Mann, Smith, McWilliams, Sweeney & Ohlson (57) ABSTRACT

An oscillatory drive unit for use in an oscillating system to be oscillated substantially at the resonance point of the oscillating system, wherein the oscillating system includes a mass to be oscillated and a countermass to which the mass is connected by resilient coupling members. The oscillatory drive unit includes a piston-cylinder-component that is operatively connected to the mass and the countermass. The piston-cylinder-component includes a cylinder chamber and a piston. The piston is arranged for reciprocal movement between a first end position and a second end position. Gas is introduced under pressure into the cylinder chamber within an energizing range of piston positions defined by a first energizing position and a second energizing position of the piston, and gas is vented from the chamber within a venting range of piston positions defined by a first venting position and a second venting position of the piston. The energizing range of piston positions being close to or including the first end position of the piston, and the venting range of piston positions being close to or including the second end position of the piston. The actual reversal points of movement of the piston adjust themselves under operating conditions of the oscillating system.

7 Claims, 5 Drawing Sheets

OSCILLATING DRIVE FOR RESONANCE SYSTEMS

RELATED APPLICATIONS

This application is a continuation of application Ser. No. 09/368,277, filed Aug. 3, 1999 now U.S. Pat. No. 6,737,748 which is a continuation in part of application Ser. No. 08/813,366, filed on Mar. 7, 1997, now abandoned.

BACKGROUND OF THE INVENTION

The invention pertains to an oscillatory drive unit for use in an oscillating system to be oscillated substantially at the resonance point of the oscillating system. The oscillating system generally includes a mass to be oscillated which mass is resiliently suspended on or supported by a counter-mass by means of any kind of resilient springs. Although the invention has particular utility in connection with oscillating conveyors that are to be operated substantially at their resonance point, the problems to be solved with the object of the invention mainly occur also in other oscillating systems that primarily operate within the resonant range.

In prior art oscillating conveyors, the resiliently supported oscillating or conveying bodies are subjected to a forced oscillation by means of a vibrator. This oscillation causes the material situated on the oscillating conveyor to travel along the conveyor. There exist so-called oscillating conveyors that are subjected to an essentially linear oscillation, the direction of which approximately corresponds to the initial angle of a parabola. Such oscillating conveyors are frequently supported in resilient fashion on leaf springs that are arranged perpendicular to the desired oscillating direction and allow a practically linear oscillation in this direction. This practically linear oscillation only deviates from linearity due to the circular arc path of the spring ends. This deviation may be neglected if the difference between the oscillation stroke and the length of the spring is sufficiently large.

In addition to electromagnetic vibrators, it is also possible to utilize piston vibrators that are pressurized with compressed air as oscillatory drives for such oscillating conveyors. The latter provide the advantage that their oscillating behavior can be better adapted to different requirements.

With respect to the expenditure of energy, it is most favorable to operate oscillating conveyors within the resonant range. Within this range, the size of the masses to be moved is inconsequential. It simply must be ensured that the energy consumed by the damping in the springs and by the moved material is replaced. In this case, only part of the weight of the material to be conveyed consumes energy. Resonance conveyors are preferably realized in the form of conveyor chutes. With respect to the operating requirements, it is, however, disadvantageous that the resonance frequency of a system depends on the respective load of the material to be conveyed and varies accordingly. In known systems, the adaptation of a resonant drive to the resonance frequency of a system represents an almost insurmountable problem. An adaptive variation of the excitation frequency during the operation of such a conveyor can only be realized with significant expenditures. Consequently, measures of this type are frequently relinquished, and the oscillating resonance drives are designed in such a way that the operating range is displaced into the ascending part of the resonance curve, i.e., far away from the resonance apex. In this case, at least part of the resonance amplification can be utilized, and a damping of the amplitude while the system is subjected to a load may, for example, be compensated due to the fact that the resonance point is simultaneously displaced to a slightly lower frequency and the fixed operating frequency is displaced into a region of higher amplitude.

Even when using a more flexible piston vibrator, the adaptation of its frequency to the resonance frequency of a system is only possible under certain conditions. In piston vibrators, the power essentially depends on the piston diameter. However, the frequency and the oscillation amplitude result from the piston weight. If a heavier piston of the same diameter is used, the oscillation amplitude is correspondingly increased and the frequency is correspondingly decreased. This applies to cylindrical as well as stepped or differential pressure piston vibrators. In order to alter the oscillating behavior of a piston vibrator, pistons with different lengths and identical diameters are frequently utilized so as to attain different moments within the same power range. Normal piston vibrators that are coupled to a system to be subjected to oscillations usually comprise a piston without a piston rod which only moves back and forward with the vibrator housing. However, it is also possible to provide one side of the piston with a piston rod that extends out of the housing. The one-sided effect of this piston rod, which reduces the piston surface, makes it necessary to realize this vibrator in the form of a differential pressure piston vibrator. The piston rod that extends out of the housing may be additionally provided with masses that reduce the frequency. An adaptation of the frequency of a piston vibrator to the resonance frequency of a system would only be possible by lowering the air pressure. However, the power of the piston vibrator varies exponentially with the frequency, i.e., this measure can generally be precluded. In conventional systems, the springs of a resonance conveyor are usually designed in such a way that the resonance frequency of the system lies within the economical operating range of a certain vibrator type. This may, for example, be realized by altering the piston mass.

Resonance conveyors are not only sensitive to load changes. The natural frequency essentially also depends on the ratings of the springs used and, for example, the weight of the conveyor. If the conveyor is structurally modified such that its weight is changed, it is possible that the conveyor no longer resonates and consequently conveys no material. In conventional so-called oscillating resonance conveyors that operate at a frequency of only approximately 85% of the resonance frequency, it is a customary procedure to operate below this frequency in order to still attain a noticeable resonance amplification of the oscillation amplitude and reduce the sensitivity of the system. If a conveyor that is correctly calculated and designed with respect to its resonance frequency is assembled on a foundation or fame that is insulated against oscillations, i.e., assembled elastically, so as to transmit the least possible oscillations onto the substructure, the mass of the foundation and its elastic support must be incorporated into the calculation, i.e., a system, the drive of which is generally adapted to the resonance frequency, no longer resonates.

The present invention is based on the objective of developing an oscillatory drive for a system with an oscillating mass and, in particular, an oscillating conveyor, in which the oscillatory drive practically recognizes the respective resonance frequency of the driven system, follows changes of this resonance frequency, and supplies the system with the energy required for maintaining the oscillations without electrical recognition or control units.

According to the invention, this objective is, in principle, attained with the characteristics disclosed in the characterizing portion of claim 1.

Although a person skilled in the art will easily ascertain that the invention can also be utilized in other oscillating systems, e.g., vibration tables, screens, filter frames, etc., the invention is described below with reference to a resonance conveyor.

Leaving aside the corresponding couplings of the individual elements, it is an essential aspect of the invention to provide an oscillatory drive, the mutually moving components of which are not positively limited with respect to their mutual oscillation amplitude, e.g., by means of a limit stop, but rather able to essentially freely adapt to a resonance oscillation of the system. In this case, it is not precluded that a certain (progressive) elastic limitation for the mutually oscillating parts is provided. Consequently, the times at which the drive supplies energy are not dependent on the reversal points of a drive component, e.g., a piston. On the contrary, the energy maybe supplied at an interim phase during the acceleration cycle of a moving drive component in order to excite this drive component to carry out amplified oscillations. It was determined that the system also operates flawlessly if the energy is supplied slightly before the reversal point.

According to the invention, the pistons of these oscillatory drive units must be able to follow the resonance oscillation of the system without impacting with a rigid limitation in the cylinder. The supply of compressed air into the cylinder chamber behind the trailing end of the piston is, for example, controlled out by the piston, e.g., during the acceleration phase of the piston after an inlet opening is released.

In order to make it possible to transmit the energy that is introduced into the oscillatory drive and must be converted into an oscillation movement as directly as possible onto the oscillating system, the coupling of the oscillatory drive to both masses in question should be as rigid as possible in the direction of the transmission of oscillations. However, if the shape and direction of the oscillations of the drive do not exactly correspond to the possible oscillation path of the driven system, it is preferred to utilize flexible or articulated rods for the coupling. These flexible or articulated rods are relatively rigid in their longitudinal direction, but allow a lateral excursion during the oscillation sequence, i.e., the piston in the oscillatory drive is not unnecessarily stressed by transverse forces.

A certain elasticity of the coupling elements in the direction of the transmission of oscillation would also be conceivable, e.g., in order to ensure that a certain reserve for the oscillation amplitude is still available at high oscillation amplitudes and an unexpected impact of the oscillatory drive piston in the housing. However, this solution is associated with the disadvantage that the oscillation energy is transmitted to the system with certain delays because such an elastic coupling of the piston creates a separate oscillating system that tends to oscillate in resonance and consequently can make it impossible to control the sequence of the energy transmission. In any case, it would be better to design the oscillatory drive in such a way that the possible piston travel suffices for the oscillation amplitudes of the system which occur during its operation.

The countermass, on which the oscillatory drives of such conveyors are supported, can consist of a stationary foundation. In this case, the countermass is rigid or practically rigid and has an essentially infinite size, i.e., the resonance frequency of the conveyor is primarily determined by its own mass and the type of its resilient support. However, the countermass may also consist of a pedestal frame of the device that is elastically supported on a foundation or substructure so as to transmit the fewest possible oscillations onto the substructure. In contrast to a rigid support, such an arrangement alters the resonance frequency of the system. According to the invention, the countermass may also consist of a mass that is freely arranged in space and held by springs that connect the countermass to the conveyor. In this case, it is necessary to suspend or support the entire system. This may, for example, be realized by suspending the entire system on the conveyor by means of very soft springs that limit degrees of freedom of the entire system as little as possible. A system that is suspended on soft springs usually has a different, essentially lower resonance frequency than that of the driven, insulated system consisting of both masses and their mutual spring coupling. The main disadvantage of such an arrangement can be seen in the fact that the oscillation amplitude of the conveyor referred to its surroundings is significantly reduced due to the lack of a support for the countermass.

Oscillating conveyors should generally cause a movement of the material to be conveyed during each oscillation, namely such that their oscillations are directed transversely upward viewed in the conveying direction of the material. A degree of elastic freedom in such a direction and the most rigid arrangement possible in the other directions is preferably realized with leaf springs that extend perpendicular to the intended oscillating direction. The ends of such leaf springs do not have a strictly linear path. As long as their oscillation amplitude is small in relation to their size, the circular arc movement can be considered to be practically linear.

It is not absolutely imperative that the oscillating direction of the oscillatory drive corresponds to the direction of the degree of oscillating freedom of the conveyor. However, the conveyor is usually designed in this fashion because only a certain component of the moment of the oscillatory drive would otherwise be used for generating the oscillations.

If only one oscillatory drive is provided in a conveyor, the elastic coupling of which to the countermass does not inevitably define the oscillating direction, it is required that the line of application of the oscillatory drive extend through the center of gravity of the oscillating mass of the conveyor. If the countermass is elastically supported, the direction of the line of application of the oscillatory drive also must extend through its center of gravity. This can be attained by designing the shape of the mass correspondingly. If the conveyor is suspended on leaf springs, it is also practical to observe this rule. However, the arrangement is less critical if several oscillatory drives are provided. Since the systems in question pertain to systems that oscillate in resonance, only one correspondingly designed oscillatory drive suffices in most instances.

The conventional crank drive also represents an oscillatory drive that is supported on a foundation frame with one end and engages on an elastically supported mass with the other end. However, the frequency and amplitude of a crank drive are predetermined during its operation, i.e., only one forced oscillation can be generated with a crank drive. As mentioned previously, it is essential for the invention that an oscillatory drive, in which the position of the reversible points is not defined, is utilized so as to ensure that the piston of the oscillatory drive which is connected to the system is able to follow the oscillations of the system in largely unobstructed fashion, i.e., its oscillation amplitude as well as its oscillation frequency are essentially also defined by the system. Due to this measure, the oscillatory drive assumes or recognizes the respective resonance frequency of the entire system.

According to the invention a pneumatic oscillatory drive unit is provided that is pressurized with the pressure medium on only one side, i.e., only from one of its reversible points, and subsequently ventilated. This piston vibrator is able to freely oscillate in the direction towards its other reversal point, with the return movement being realized without the assistance of external energy, namely by the coupled system that oscillates backward. In piston vibrators that are provided with a piston rod that extends out of the housing and charged with pressure on both sides, it is possible to operate exclusively with a differential pressure. However, in a vibrator that is pressurized with pressure on only one side, preferably the side situated opposite to the piston rod, the entire piston surface is available for pressurizing the piston. This is particularly advantageous for the start-up of a system that operates in resonance. Before the resonance frequency is reached during the start-up, higher restoring forces of the springs usually must be overcome. If it is ensured that a vibrator that is pressurized on one side is situated in a suitable start-up position in the idle state of the device, the system can be started without problems by pressurizing the vibrator with the full pressure. Since the system automatically transforms into the resonance mode during its operation, a change in the pressure of the operating medium and consequently the supplied energy only causes the oscillating amplitude to change. The required supplementary energy supplied to the system can be adapted solely by changing the pressure.

BRIEF DESCRIPTION OF THE DRAWING FIGURES

The invention is described in detail below with reference to the enclosed figures. The figures show.

DETAILED DESCRIPTION OF THE PREFERRED EMBODIMENTS

Figure 1:
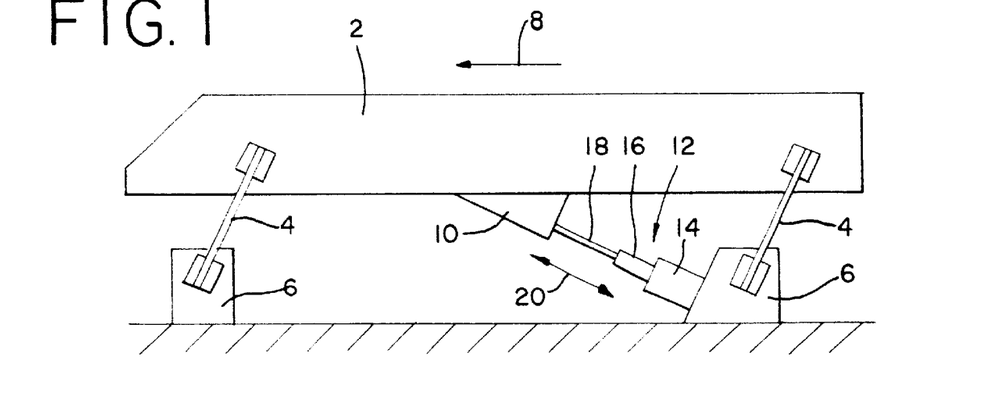
FIG. 1, a resonance conveyor that is supported in oscillating fashion on a rigid foundation by means of leaf springs, with said resonance conveyor comprising an oscillatory drive that engages on the conveyor with one end and on the foundation with the other end.

FIG. 1 schematically shows an oscillating conveyor with a conveyor body 2 that is resiliently supported on two rigid foundation blocks 6 via leaf springs 4. The arrow 8 indicates the intended conveying direction. An oscillatory drive 12 is arranged between a lower projection 10 of the conveyor body and the rear foundation block 6. This oscillatory drive 12 comprises a cylinder 14 that is fastened to the rear foundation block 6. A piston rod 16 that is connected to the projection 10 of the conveyor body 2 via a connecting rod 18 protrudes from the other side of the cylinder 14. In this embodiment, the oscillatory drive 12 that is pressurized with compressed air and excites the system such that it oscillates as indicated by the double arrow 20.

Figure 2:
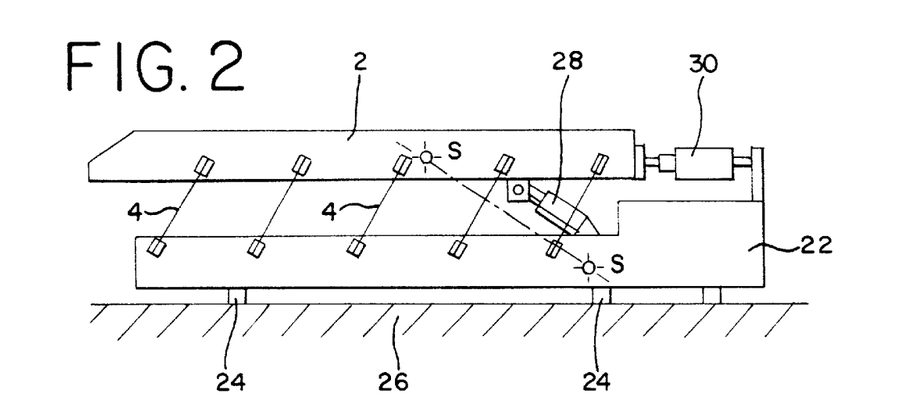
FIG. 2, a resonance conveyor that is supported on an elastic pedestal by means of leaf springs as well as two possible arrangements of the oscillatory drive.

FIG. 2 shows a resonance conveyor, the conveyor body 2 of which is also resiliently supported on leaf springs 4. However, the lower ends of these leaf springs are connected to a pedestal. block 22 that is supported on the substructure 26 via elastic bearings 24. This embodiment comprises two oscillatory drives 28 and 30 that engage on the conveyor body 2 and on the pedestal block 22. This figure shows an alternative arrangement of the oscillatory drives 28 and 30. The line of application of the oscillatory drive 28 extends parallel to and near the connecting line between the centers of gravity S of the conveyor body 2 and the pedestal block 22. An exact concurrence between the line of application of the oscillatory drive 28 and the connecting line between the centers of gravity S is not absolutely imperative in such an arrangement with multiple leaf springs 4. If an additional drive is provided in the position of the oscillatory drive 30, its line of application extends through the center of gravity S of the conveyor body 2, but not through the center of gravity of the pedestal block 22. Since the pedestal block is very long, its elastic bearings 24 are subjected to shear stress by this arrangement. However, a tilting movement can be practically precluded if the elastic bearings 24 have a relatively high compressive strength.

Figure 3:
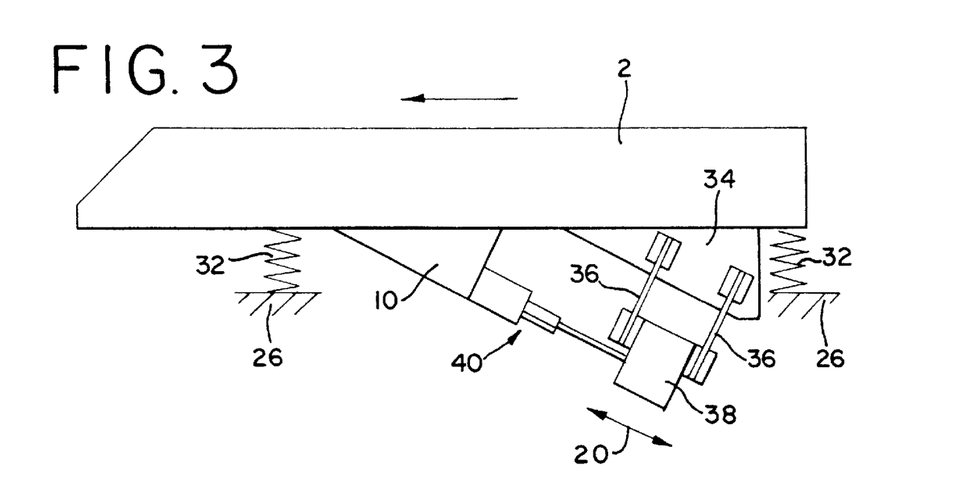
FIG. 3, a resonance conveyor that is supported on soft coil springs and connected to a countermass via leaf springs, with the oscillatory drive engaging on the conveyor and the countermass.

FIG. 3 shows a resonance conveyor, the conveyor body 2 of which is supported on the substructure 26 by means of relatively soft coil springs that are arranged vertically. The conveyor body is provided with leaf springs 36 on a rear projection 34 which carry a countermass 38. An oscillatory drive 40 engages on one additional projection 10 of the conveyor body 2 and on the countermass 38. The oscillating direction is again indicated by a double arrow 20.

Figure 4:
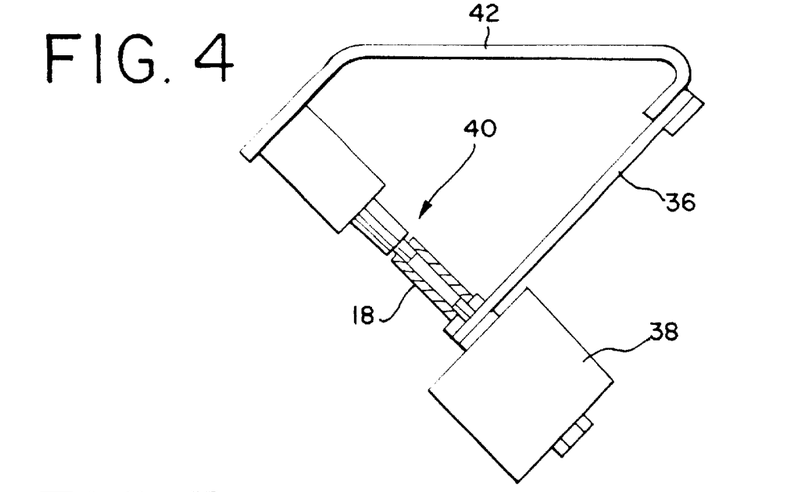
FIG. 4, a compact structural unit for a resonance conveyor according to FIG. 3 which comprises the oscillatory drive, the leaf springs, and the countermass.

FIG. 4 shows a compact system that may be connected to a conveyor body 2 according to FIG. 3 in preassembled fashion. This system carries the springs 36 and the oscillatory drive 40 on a frame 42. The ends of the leaf springs 36 are connected to one end of the oscillatory drive 40 and to the countermass 38. The connecting rod 18 of the oscillatory drive 40 is realized in the form of a partially flexible plastic tube that, however, is realized in non-bucking fashion in its longitudinal direction. Since the lower ends of the leaf springs 36 do not exactly describe a linear path in the oscillating mode, but rather a circular arc path with respect to the frame 42, the flexible connecting rod 18 prevents transverse forces from acting upon the piston of the oscillatory drive 40.

Figure 5A:
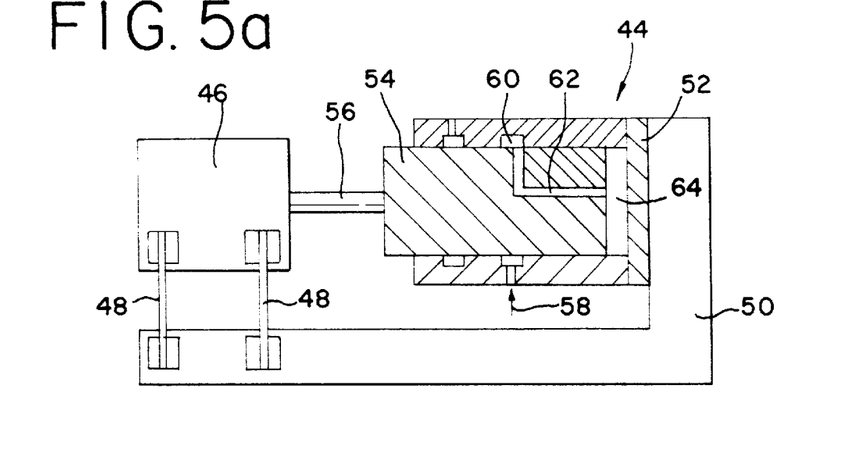
FIGS. 5a and b, a schematic representation of a system similar to that of FIG. 1 with a fluid-driven piston vibrator in the oscillatory drive that is pressurized with fluid on one side.
Figure 5B:
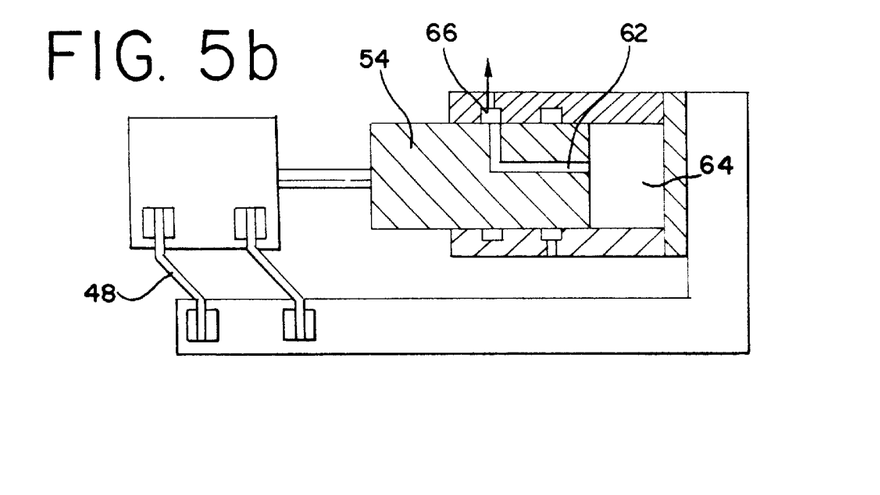

FIG. 5 shows an oscillatory drive 44 that is pressurized on one side and embedded in an oscillating system similar to FIG. 1. The mass 46 represents the conveyor body 2 and is supported on a countermass 50 via leaf springs 48. The oscillatory drive 44 comprises a cylinder 52 that is fastened to the countermass 50 as well as a piston 54 that is arranged such that it can be linearly displaced in the cylinder 52 and connected to the mass 46 via a connecting rod 56.

FIGS. 5a and 5b show an oscillatory drive 44 that is pressurized on one side and embedded in an oscillating system similar to FIG. 1. The mass 46 represents the conveyor body 2 and is supported on a countermass 50 via leaf springs 48. The oscillatory drive 44 comprises a cylinder 52 that is fastened to the countermass 50 as well as a piston 54 that is arranged such that it can be linearly displaced in the cylinder 52 and connected to the mass 46 via a connecting rod 56.

Having reference to FIGS. 6a to 6e, the drive unit of the system according to FIGS. 5a and 5b is described in more detail, particularly its operating cycle.

The drive unit in the form of a piston cylinder component includes a cylinder 52 and the piston 54. Having particular reference to FIG. 6d the cylinder chamber 64 is defined by the inner end wall 68 and the inner side wall 70 of the cylinder 52 and a first end face 72 of the piston 54. The other end face 74 of the piston 54 is provided with connecting means 56, for example in the form of a piston rod as described herein above. Connecting means with which the cylinder 52 might be fixed to one part of the oscillating system are not shown. They may be of any conventional type.

In the cylinder 52 are provided an air supply duct 58 and a venting duct 76. The piston 54 is provided with the piston channel 62 one end which opens into the outer side wall 78 of piston 54, while the other end of piston channel 62 communicates with the cylinder chamber 64.

At the interface of outer sidewall 78 of piston 54 and inner sidewall 70 of cylinder 52 two communicating spaces in the form of a first circumferential groove 60 and a second circumferential groove 66 are formed in the inner sidewall 70 of cylinder 52. It is apparent that air supply duct 58 opens with an outlet port into the first circumferential groove 60, whereas venting duct 76 opens with its intake port into the second circumferential groove 66.

Figure 6A:
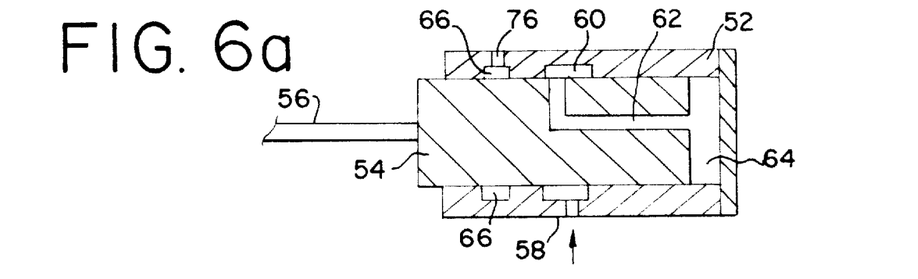
FIGS. 6a–6e, the oscillating drive of the system of FIGS. 5a and 5b in various operating positions.
Figure 6B:
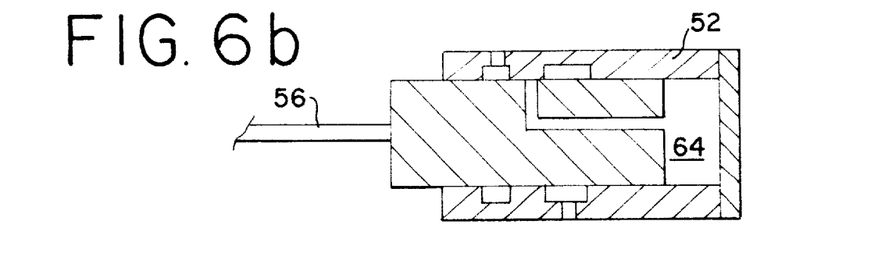
Figure 6C:
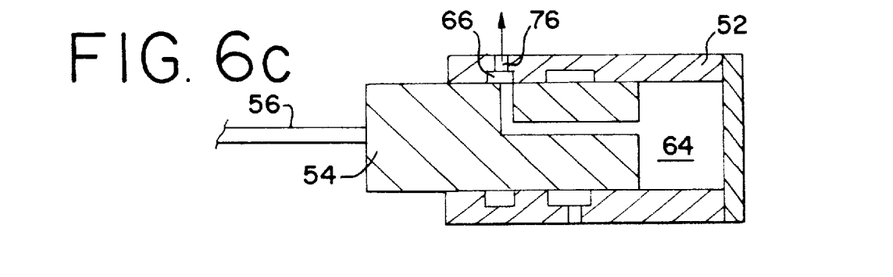
Figure 6D:
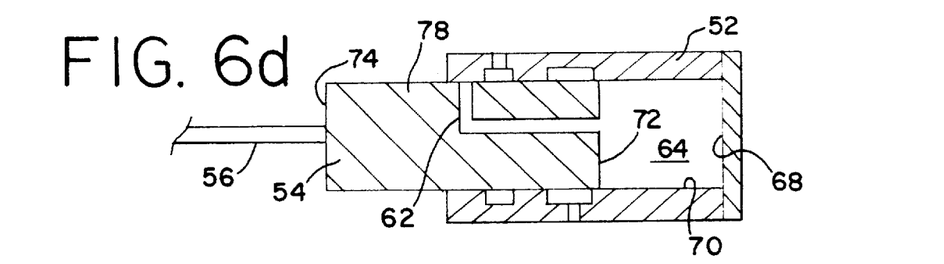
Figure 6E:
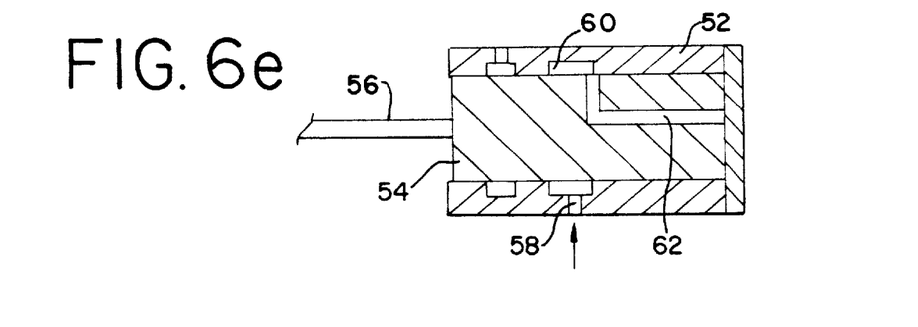

Piston 54 assumes a first end position when its first end face 72 is close to or even abuts the inner end wall 68 of the cylinder as shown in FIG. 6e. A second end position of piston 54, in which its first end face 72 is most remote from the inner end wall 68 of the cylinder is shown in FIG. 6d. This second end position in which the piston is in its outer left position with reference to the drawings may be determined by an abutment of the oscillating system, to which the drive unit is connected, it is as well possible to limit the piston movement to the left by an extension of the cylinder 52 having an abutment for the second end face of the piston as it is shown further down in connection with the embodiment of FIG. 8.

For ease of explanation, a few piston positions are defined as follows: While the piston channel 62 is in communication with circumferential groove 60, this range of piston positions is defined as the energizing range of piston positions, because during that time cylinder chamber 64 communicates with air supply duct 58 via circumferential groove 60 and the piston channel 62, so that the cylinder chamber 64 is put under supply pressure. The range of energizing positions of the piston 54 is defined by a first energizing position which is shown in FIG. 6e which piston channel 62 just comes into communication with circumferential grooves 60 at the latter's right side. In the embodiment of FIG. 6e, the first end position of the piston and its first energizing position are practically identical. When piston channel 62 reaches on its travel to the left the left side of the circumferential groove 60 the air supply will be shut off. This position is defined as the second energizing position. Likewise, when piston channel 62 travels further to the left and gets into contact with circumferential venting groove 66 this is the first venting position, and when it leaves the left side of venting groove 66 it has reached its second venting position. The range between those two positions is the venting range of piston position. On its return stroke, piston 54 reaches the described positions in a reverse sequence.

When incorporated in an oscillated system, the drive unit should be mounted to that system in a way that when the system is at rest, the piston 54 assumes a position as shown in FIG. 6a. This position eases start-up of the system, since when the air supply is opened via air supply duct 58, the cylinder chamber 64 will immediately be charged with air under pressure, so that piston 54 starts its travel to the left side. When the piston passes its second energizing position, the air supply to cylinder chamber 64 will be shut off. The expansion of the air under pressure in cylinder chamber 64 will cause further movement of the piston to the left. On the further travel of the piston 54 to the left, a situation may be reached in which the air volume confined in cylinder chamber 64 has expanded to atmospheric pressure, so that further movement of the piston to the left would cause a vacuum in the cylinder chamber which would brake the piston movement. This is the right moment to vent the cylinder chamber 64 to the environment which situation is achieved by the piston reaching its first venting position in which piston channel 62 enters into communication with venting groove 66.

Yet, according to the embodiment shown in FIG. 6, the venting will only occur over a limited range of piston positions until piston channel 62 will have passed the left side of venting groove 66, i.e. its second venting position. Further movement of piston 54 to the left may indeed cause a slight vacuum in cylinder chamber 64. Such vacuum formation could for example be avoided if circumferential venting groove 66 would be extended right to the left end of the cylinder. A slight vacuum at the left end of the piston stroke when the piston 54 approaches its second end position may on the other hand be advantageous for braking the system somewhat near the reversal point, so that the piston respectively the system reverses its direction before the piston abuts in its second end position. This is likewise the for the first end position of the piston as will be explained further below.

The reverse stroke of the piston after having reached its left reversal point will be caused by the resilient forces of the oscillating system to which the drive unit is connected. During the beginning reverse movement of the piston the vacuum, if any, will be reduced again and the piston will reach its second venting position in which the cylinder chamber 64 gets again into communication with the venting groove 66. This has the effect that during the venting range of positions of the piston the air in cylinder chamber 64 will not be compressed and will thus not brake the piston movement. Some compression of the air in cylinder chamber 64 will already occur when the piston has passed its first venting position. Such compression initiates already the charge phase which will be entered when the piston reaches its second energizing position. This means that before the piston has reached its first end position to the right, the cylinder chamber 64 will already be charged with air under pressure, braking the piston in a way that the piston without actually reaching its first end position to the right will reverse its movement and be further charged with air under pressure until the piston, now in its movement to the left side will again have passed the second energizing position. The cycle described above is then repeated.

It is important to note that the piston will be charged only by an energy impulse of limited duration after it has reached its right reversal position. The duration of the energy impulse is principally determined by the axial width of the first circumferential groove 60 and the speed of the piston while it passes its energy range of positions. Therefore, the positions and widths of grooves 60 and 66 are to be adapted to particular operating conditions.

Figure 7:
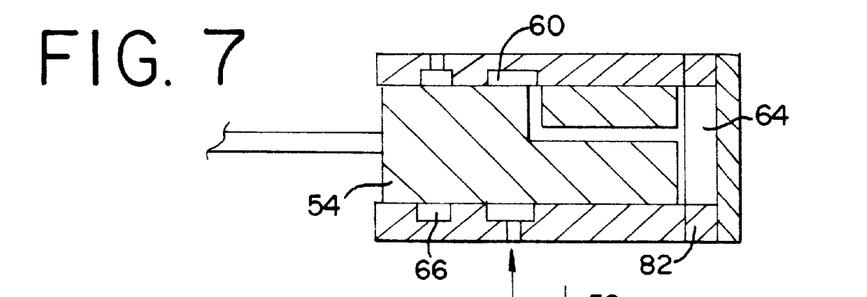
FIG. 7, a modification of the oscillating drive of FIG. 6.

The actual reversal points of the movement of the piston are determined by the oscillating system to which the drive unit is connected. As mentioned above, it should be taken care that the piston in its system-determined stroke does not abut in its end positions. Concerning the second end position to the left, it may be advantageous to allow a certain vacuum to be formed in order to brake the piston before it reaches its reversal point. An open left cylinder end as shown in FIG. 6 will, however, avoid an abutment on the left side. On the right side, the cylinder must naturally be closed. In order to avoid abutment of the piston in its first end position at the right at the inner cylinder end wall 68, a cylinder extension component 82 as shown in FIG. 7 may be used. It is apparent from FIG. 7 that piston 54 is there shown in its first energizing position where communication with the pressure supply starts. It is clear from FIG. 7 that the piston could be moved further to the right to reach its first end position in which the air supply is discontinued. First end position of the piston at the right end and the first energizing position are not identical in this embodiment. Instead of using a cylinder extension component, the same arrangement could be obtained by using a longer cylinder or by shifting the circumferential grooves 60 and 66 farther to the left in comparison with the embodiment of FIG. 6. The operation of such an embodiment is as follows:

When the piston 54 is on its spring operated reverse stroke to the right, cylinder chamber 64 will be charged with compressed air once the piston has passed its second energizing position. The air pressure in the cylinder chamber 64 will remain constant until the piston will have passed its first energizing position. From then onwards the shut-off air in the cylinder chamber will be compressed, thus further supporting a deceleration of the system. Then, sometime after the piston has passed its right reversal point, mainly influenced by the oscillating system, the actual energizing impulse will take place while the piston moves on its energizing stroke to the left side again through the energizing range of positions.

In this way, a system oscillation with a somewhat restricted amplitude may be obtained while the system nevertheless remains in resonance. The energy impulses just make up for energy losses in the system without forcing the system into a certain oscillating frequency.

The oscillatory drive of the embodiments of FIGS. 6 and 7 is very cheap to produce insofar as it does not need any particular sealing of the piston within the cylinder. A certain leakage of air around the piston is not detrimental to the functioning of the drive. It may rather facilitate piston movement within the cylinder. The piston may for example be produced of a low-friction plastic material.

Figure 8A:
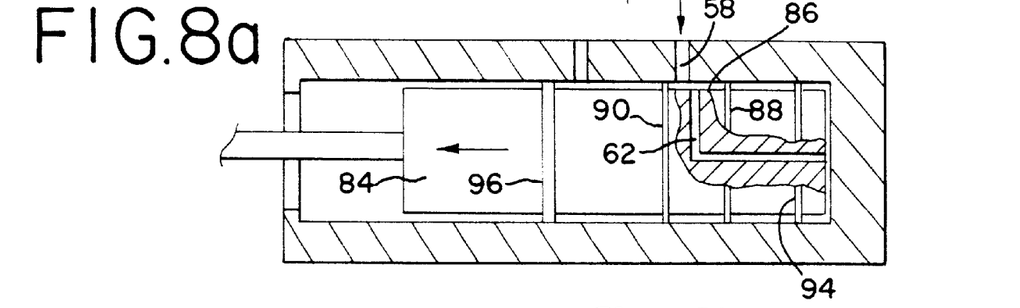
FIGS. 8a–8c, another embodiment of an oscillating drive in various operating positions.
Figure 8B:
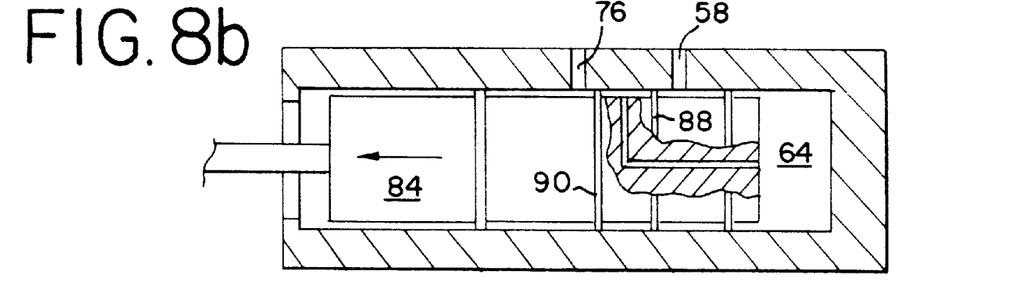
Figure 8C:
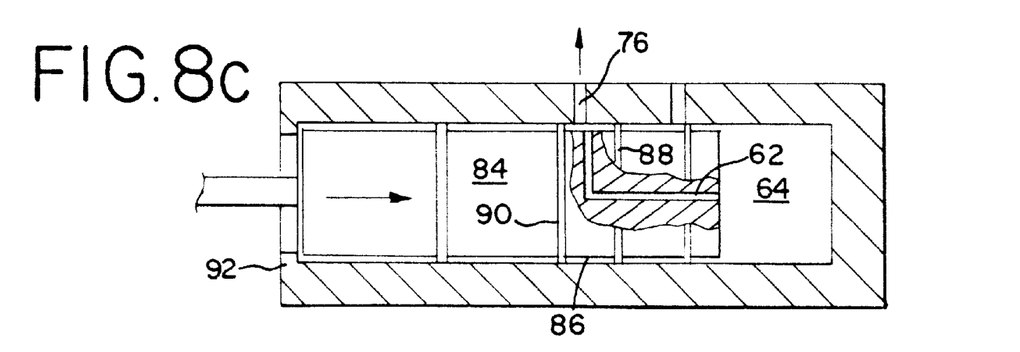

The embodiment of FIGS. 8a to 8c show the design of an oscillatory drive unit in which the communication space, the axial length of which determines the duration of the ranges of the energizing and venting positions of the piston has been provided on the piston side instead of in the cylinder wall as in the embodiment of FIG. 6. Since contrary to the embodiment of FIG. 6 where the communication spaces in form of the two circumferential grooves are stationary, the communication space of the embodiment of FIG. 8 moves along with the piston. This has the consequence that only a single communicating space may be provided into which the piston channel opens. The disadvantage is in this embodiment that the ranges of the energizing and venting positions of the piston may not be altered separately.

Figure 9:
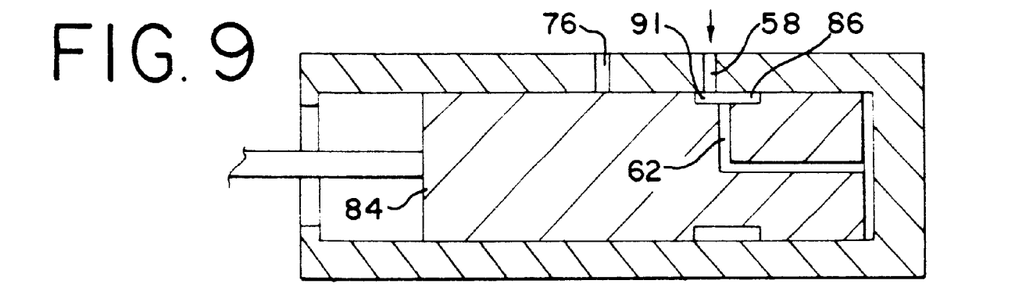
FIG. 9 shows a further embodiment of an oscillating drive.

FIG. 8 shows an oscillatory drive unit with a piston 84 at the outer sidewall of which a single communicating space 86 surrounding the piston is defined in its axial extension by two protruding piston rings 88 and 90. The one end of piston channel 62 opens into the space between those piston rings. FIG. 9 shows an oscillatory drive unit wherein the single communication space 86 is formed by a circumferential groove 91 in the outer sidewall of the piston 84.

It is apparent from FIGS. 8a to 8c that the energizing range of positions of the piston and the range of venting position of the piston are defined by registration of either the air supply duct 58 or the venting duct 76 with the communicating space 86 between piston rings 88 and 90.

Beyond that the operation of the drive unit according to FIG. 8 corresponds with that of FIG. 6. A further difference in design is that in the embodiment of FIG. 8 the cylinder has at its left end an abutment collar 92 which defines the second end position of piston 84.

For better sealing and guidance of piston 84 within the cylinder, a further piston ring 94 and a guide ring 96 are arranged around piston 84.

FIG. 8a shows the drive unit in energizing position, FIG. 8b in an intermediate position and FIG. 8c in venting position during the reverse stroke.

The described drive units are simple in construction and allow an effective drive for keeping oscillatory systems in resonance. The drive is completely self-regulating. The resonance frequency is determined by the oscillating system. Only the amplitude of the system may be curtailed somewhat by certain embodiments of the drive in which the piston movement is somewhat retarded near its reversal points. For the rest the system can swing freely and only energy losses will be replaced by the energy impulses given by the drive unit. The impulse energy may be altered by merely adjusting the gas pressure.

Drive units with a piston that is pressurized on only on e side solve one additional construction problem because it is no longer necessary to utilize an expensive piston that is precisely adapted to the cylinder and mutually seals both cylinder chambers. In piston vibrators that are pressurized on only one side, it is possible to utilize less expensive materials, e.g., plastic pistons with a seal. In addition, the compression spring of the system that acts on the other side of the piston eliminates startup problems in the dead center, which occur in piston vibrators that are pressurized on both sides.

When used in oscillating resonance conveyors, the previously described drive unit eliminates the problems of known oscillating resonance conveyors because it is practically only able to oscillate in the natural resonance of the system, namely independent of whether the system in question is a two-mass or multi-mass system in which the respective masses are connected to one another by means of springs so as to form an oscillating system.

What is claimed is:

1. An oscillatory drive unit for use in an oscillating system to be oscillated substantially at the resonance point of the oscillating system, wherein the oscillating system includes a mass to be oscillated and a countermass, to which the mass is connected by resilient coupling means, said oscillatory drive unit comprising:

a piston-cylinder-component for energization by a gas under pressure, the cylinder of the piston-cylindercomponent being adapted to be operatively connected to either the mass or the countermass and the piston of the piston cylinder component having connecting means being adapted to be operatively connected to the respective other of the mass or countermass, wherein, the piston-cylinder-component comprises a single cylinder chamber being defined by an inner end wall and the inner side wall of the cylinder and a first end face of the piston, the opposite or second end face of the piston being provided with said connecting means, the piston is arranged for reciprocal movement between a first end position in which the first end face of the piston is close to the inner end wall of the cylinder and a second end position in which the first end face of the piston is most remote from the inner end wall of the cylinder, the piston-cylinder-component has inlet means for the gas under pressure, such inlet means being operative to introduce gas under pressure into the cylinder chamber within an energizing range of piston positions being defined by a first energizing position and a second energizing position of the piston, the first energizing position being closer to the cylinder end wall than the second energizing position, the piston-cylinder-component has venting means for venting the cylinder chamber to the environment, which venting means are operative within a venting range of piston positions being defined by a first venting position and a second venting position of the piston, the first venting position being closer to the cylinder end wall than the second venting position, the energizing range of piston positions being close to or including the first end position of the piston, and the venting range of piston positions being close to or including the second end position of the piston, the actual reversal points of movement of the piston adjusting themselves under operating conditions of the oscillating system.

2. The drive unit according to claim 1, wherein the resilient coupling means between the mass and the countermass are spring means.

3. The drive unit according to claim 1, wherein
the inlet means for the gas under pressure comprise a gas supply duct provided in the cylinder wall and having an outlet port opening into the inner cylinder wall,
the venting means comprise a venting duct provided in the cylinder wall and having an intake port opening into the inner cylinder side wall,
the piston is provided with a piston channel, which piston channel opens with one end into the outer side wail of the piston and communicates with its other end with the cylinder chamber, and wherein
a first communicating space is provided, into which the outlet port of the gas supply duct opens, and a second communicating space, into which the intake port of the venting duct opens, the first and the second communicating spaces both being formed as circumferential grooves in the inner cylinder side wall.

4. The drive unit according to claim 3 wherein the second communicating space and the venting duct are unitary in that the circumferential groove forming the second communicating space is axially open to the cylinder end.

5. The drive unit according to claim 1 including a communicating space at the interface of an outer side wall of the piston and the inner side wall of the cylinder, the communicating space being in communication with the cylinder chamber, whereby the communicating space is in communication with the inlet means when the piston is in the first end position, and whereby the communicating space is in communication with the venting means when the piston is in the second end position.

6. The drive unit according to claim 5 wherein the communicating space is formed by sealing rings.

7. The drive unit according to claim 5 wherein the communicating space comprises a circumferential groove formed in the side wall of the piston or in the inner side wall of the cylinder.

* * * * *